(12) United States Patent
Thomeer et al.

(10) Patent No.: US 6,431,271 B1
(45) Date of Patent: Aug. 13, 2002

(54) APPARATUS COMPRISING BISTABLE STRUCTURES AND METHODS FOR THEIR USE IN OIL AND GAS WELLS

(75) Inventors: Hubertus V. Thomeer, Houston; Zheng R. Xu; Jeffrey R. Beckel, both of Sugar Land, all of TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 51 days.

(21) Appl. No.: 09/666,734

(22) Filed: Sep. 20, 2000

(51) Int. Cl.[7] .............................................. E21B 19/18
(52) U.S. Cl. ..................... 166/77.51; 166/195; 166/207
(58) Field of Search .............................. 166/77.1, 77.4, 166/77.5, 80.1, 117, 63, 153, 181, 192, 195, 296, 231, 207, 373, 374, 381, 385–387, 383

(56) References Cited

U.S. PATENT DOCUMENTS 5,456,319 A * 10/1995 Schmidt et al.
5,901,789 A * 5/1999 Donnelly et al.

* cited by examiner

Primary Examiner—Roger Schoeppel
(74) Attorney, Agent, or Firm—Stephen Schlather; Brigitte L. Jeffery; John J. Ryberg (57) ABSTRACT

Apparatus for use in a wellbore comprises (1) a first structure that comprises (a) at least one extendable member that can be reconfigured from a coiled form to an extended form, the member having a flattened transverse cross-section when in the coiled form and a curved transverse cross-section when in the extended form, (b) a downhole well tool attached to the extendable member, and (c) a housing in which the extendable member can be coiled; (2) a well mounting device for supporting the first structure from the wellbore or the surface of a well; and (3) means for reconfiguring the extendable, coilable member in a wellbore from the coiled form to the extended form. Preferably, the extendable member is reversibly configurable between the coiled form and the extended form.

26 Claims, 8 Drawing Sheets

APPARATUS COMPRISING BISTABLE STRUCTURES AND METHODS FOR THEIR USE IN OIL AND GAS WELLS

BACKGROUND OF THE INVENTION

This invention relates to equipment that can be used in the drilling and completion of oil and gas wells, in production of hydrocarbons from such wells, and in other operations in such wells.

Hydrocarbon fluids such as oil and natural gas are obtained from a subterranean geologic formation (a "reservoir") by drilling a well that penetrates the hydrocarbon-bearing formation. Once a wellbore has been drilled, the well must be completed before hydrocarbons can be produced from the well. Completion generally includes the installation of casing and one or more tubing strings in the wellbore, cementing, the installation of a variety of downhole equipment, such as packers and flow control devices, and in most cases perforating the casing to allow the hydrocarbons to flow from the formation into the wellbore.

After a well is completed and production of hydrocarbon fluids begins, there are a number of situations in which it is necessary to lower mechanical and/or electrical apparatus into the well to perform various operations. Such apparatus is commonly attached to a wireline and lowered into the well to the desired depth. However, the space available in which to lower such devices is limited, taking into account the size of the well casing and the tubing located within the casing, and also taking into account the apparatus (such as packers, safety valves, mandrels, and the like) that are typically located at various depths in a well. Generally, the devices that are to be lowered into the well must have a profile, in a horizontal cross-section, that is smaller than the opening (e.g., the inner diameter of the production tubing in the well) through which it will pass. This physical size constraint is a major problem in the design and operation of well equipment.

There is a long-standing need for improved equipment and methods for lowering apparatus into oil and gas wells, such that the apparatus can perform one or more useful functions downhole in the well. There is also a need to reduce the space required and the weight loads imposed on the well location "footprint," the surface area on which work related to the well is performed.

SUMMARY OF THE INVENTION

The present invention relates to apparatus for use in a wellbore that comprises (1) a first structure that comprises (a) at least one extendable member that can be reconfigured from a coiled form to an extended form, the member having a flattened transverse cross-section when in the coiled form and a curved transverse cross-section when in the extended form, (b) a downhole well tool attached to the extendable member, and (c) a housing in which the extendable member can be coiled; (2) a well mounting device for supporting the first structure from the wellbore or the surface of a well; and (3) means for reconfiguring the extendable, coilable member in a wellbore from the coiled form to the extended form. The present invention also relates to methods of using such apparatus in a wellbore.

Preferably, the extendable member is reversibly configurable between the coiled form and the extended form. In other words, the member can be initially in the coiled form, and can be extended, and later retracted back into the coiled form. Preferably, this reconfiguration can be repeated many times.

In a preferred embodiment of the invention, the extendable member has a substantially planar cross-section when in the coiled form. "Substantially planar" in this context means that the member is nearly flat if not entirely so when viewed in a cross-section transverse to the member's longitudinal axis. In the extended form, preferably the member has circular, semi-circular, oval, or semi-oval transverse cross-section, although other cross-sectional configurations are possible as well.

The well mounting device can be, for example, a wireline, well tubing, well casing, or coiled tubing. The means for reconfiguring the extendable member can comprise, for example, a spool and electric motor for spooling and unspooling the member.

Specific examples of the present invention include laterally extendable bottom hole assemblies that comprise a sensor module (for measuring pressure, temperature, pH, flow rate, or other wellbore parameters), wrappable downhole sensor assemblies, dual function umbilical-wireline structures, coiled tubing inspection tools, and corrosion-resistant coiled tubing liners.

Various embodiments of the present invention have one or more advantages compared to prior equipment and methods. Equipment of the present invention comprising bistable members can be relatively light and compact, and can be controlled from a remote location. The compactness of such devices can offer significant design flexibility, because the bistable members can expand to a relatively large size in comparison to the space they take up in coiled form. Equipment according to the present invention will in many situations also be relatively easy to install in a wellbore. Further, in certain embodiments, when the bistable member is extended, it has sufficient strength to be self-supporting. The present invention can also provide flexibility in delivering well tools downhole, in that equipment comprising the bistable member can be connected to conventional well tubing, a wireline, or coiled tubing, among other approaches.

DETAILED DESCRIPTION OF SPECIFIC EMBODIMENTS

The present invention uses bistable structures. These bistable structures comprise one or more extendable, coilable members that can be reconfigured from a coiled or retracted state to an extended state. Preferably, the members are capable of reversible configuration from one state to the other and back a plurality of times. Suitable structures are disclosed in the following international patent applications, each of which is incorporated here by reference: WO 88/08620, WO 97/35706, WO 99/62811, and WO 99/62812. Such bistable structures are available from Rolatube Technology Limited (United Kingdom).

The extendable, coilable members used in these structures typically have, when in their coiled form, a relatively planar cross-section. When in their extended form, the members typically have a semicircular or fully circular cross-section. Alternatively, they can have oval or other cross-sectional configurations. The members can also be constructed whereby the modulus of elasticity will vary along its length, width and/or thickness. The difference in cross-sectional configuration in the two states allows the members to be coiled up or retracted into a much smaller volume than they occupy in their extended state.

As described in the above-referenced patent applications, such a bistable member generally comprises material that creates a bias towards configuring the material in the extended form (e.g., having a circular cross-section), as well as material that creates a bias opposite to the first bias (e.g., one that biases the member towards its flattened, retracted or coiled form). The member can comprise a resilient substrate, made of metal for example, which is biased toward the extended form (e.g., biased toward making the member have a circular cross-section), laminated with a plastic layer that tends to bias the member towards the retracted form (e.g., having a flattened cross-section). Alternatively, the member can comprise a strip or sheet of a thermoplastic material having prestressing means attached thereto or embedded therein. One particular example is a thermoplastic strip having prestressed fibers therein (such as fibers of glass, carbon, or polymeric materials). The fibers can be located at different angles relative to each other in the plane of the coiled member, such as comprising one set of fibers that are longitudinally extending and a second set of fibers that are transversely extending. However, it is not required that the fibers be at 90° angles to each other. Such fiber-reinforced composite members (e.g., a thermoplastic resin, such as polyethylene or polypropylene, with fibers of another material, such as glass, carbon, or aramid, embedded therein) are preferred for use in the present invention.

Figure 1:
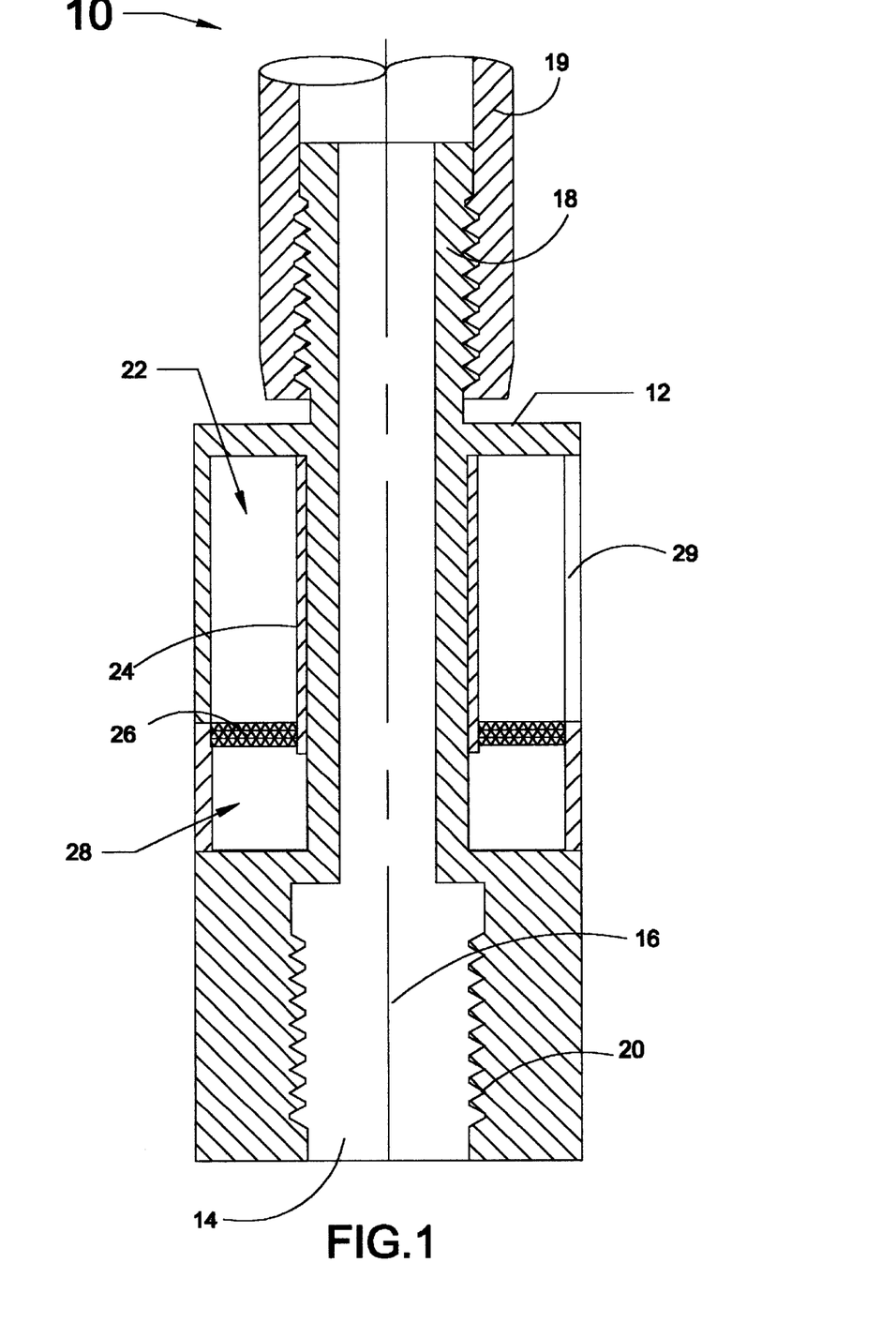
FIGS. 1–4 shows various aspects of a laterally extendable bottom-hole assembly of the present invention.

FIG. 1 shows one application of this technology in the borehole of an oil or gas well, specifically a laterally extendable bottom-hole assembly 10. This assembly 10 can be generally cylindrical in shape, to conform to the space available in a borehole, and will typically comprise a housing 12 and an open bore 14 therethrough along it longitudinal axis 16. Threads 18 and 20 can be located at the two ends of the housing to allow attachment of the assembly 10 to well tubulars 19 or the like. Alternatively, the assembly 10 can be suspended from a wireline or coiled tubing.

The assembly includes a laterally-extendable bistable member 22, a drum 24 around which the member 22 can be wrapped or spooled, a motor 26 for rotating the drum and thereby reconfiguring it between its coiled form and its extended form, and a storage battery 28 for supplying electrical power to the motor. The motor alternatively could be a hydraulic, wound spring, or other type of motor. The motor could be activated by a J-mechanism (such as used to set and release retrievable packers), with an electrical cable extending to the surface, or could be activated by wireless signals. The member can be extended through an aperture 29 in the housing 12 into its extended state. The assembly can also comprise a conductive cable (not shown in FIG. 1) connecting the motor 26 to a control panel at the surface of the well, so that an operator can deploy the member 22 into its extended state, or retract the member and spool it into the drum 24. Alternatively, as described above, control of the motor could be accomplished by wireless means. Such control alternatives can be used with the other embodiments described herein as well.

An extendable bistable member of the present invention could also be used as an anchor to secure the member and any attached tool string within the well at a desired location (i.e., by gripping contact with a desired location on the wall of a well tubular). A laterally-extendable bistable member of the present invention could also be used as a fishing tool, by extending the member into the inner diameter of a pipe or other object that is detached in the well. By deploying the member into its extended state, it could seize the object ("fish") and enable it to be removed from the wellbore.

A laterally-extendable bistable member of the present invention could also be used to convey a downhole tool, such as an expandable screen for sand control or a patch for tubular repair, and deploy it downhole.

In another embodiment of the invention, the extendable member can be run into a well with a casing string, such that power and data conductors (e.g., cables) for downhole tools can be protected from damage as they are being run into the well.

Although in some embodiments of the invention, the extendable members are capable of reversible configuration from one state to the other and back a plurality of times, in other embodiments such reversiblity is not required. For example, an extendable member of the present invention can be reeled into a well, and optionally sealed (as will be described in more detail below), such that the extended member essentially becomes a permanent or semi-permanent part of the well. Even in those embodiments, the sealed member could be removed from the well, for example by cutting it into sections as it is removed a piece at a time.

Figure 2:
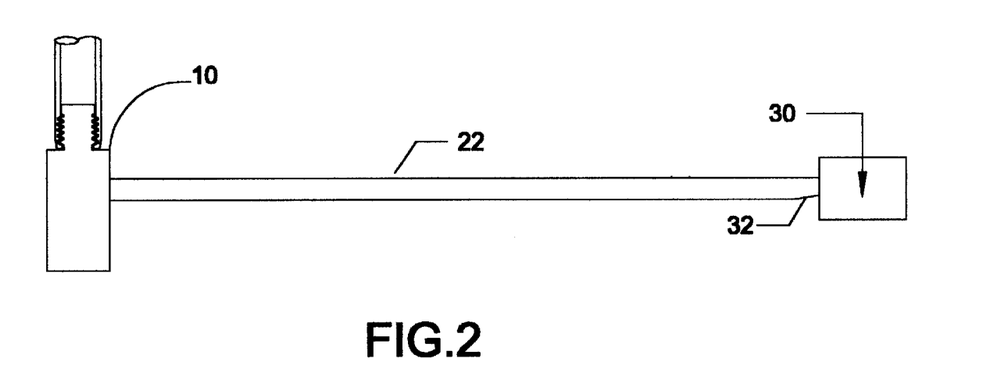

FIG. 2 shows the assembly 10 with the member 22 in a laterally extended state, and with a sensor module 30 attached to the distal end 32 of the member 22. The sensor module can comprise sensors for determining the pressure, temperature, flow rate, pH, or other parameters of the wellbore. The sensor module can optionally comprise a camera for collecting image data from the wellbore. The sensors could be of a variety of different types, including piezoelectric and piezoresistive transducers, strain gauge inductive coils matched with microelectronics, or microelectronic machines.

Figure 3:
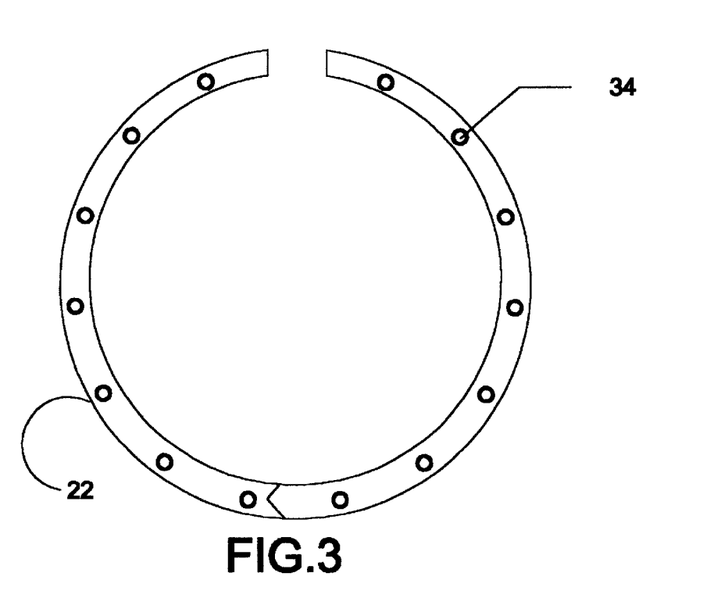
Figure 4:
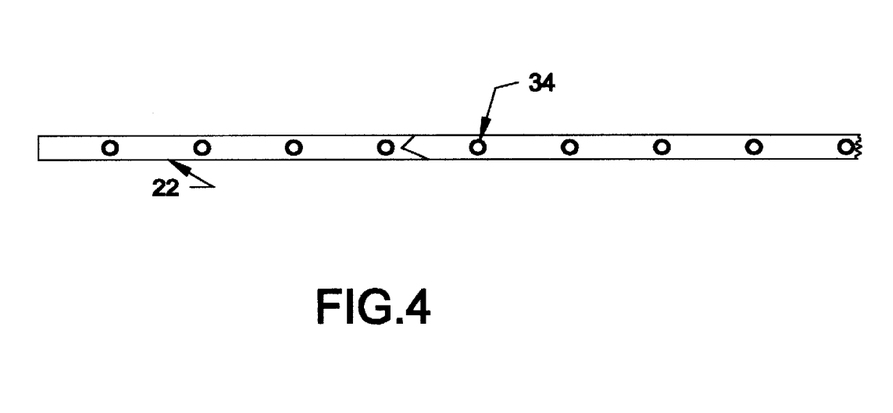

FIG. 3 shows a cross-sectional view of the member 22 in its extended form and FIG. 4 shows a cross-sectional view of the member in its coiled form. One or more conductors 34 are embedded in the member 22 such that data can be conveyed from the sensor module back to the main assembly 10, and from there to the surface of the well. Alternatively, elongated sensors can be embedded in the member 22, such that sensing can take place along the length of the member. Transmission of data to the surface can be accomplished through electrically conductive cables, or by various wireless means, such as by encoding data in pressure pulses in well fluids, or by electromagnetic transmission of signals through the well tubulars, as is well known to those skilled in this field.

This embodiment of the invention can provide for inspection, location, and maintenance of wells with control from a remote location, and is particularly useful in wells having multilateral boreholes, because the assembly 10 can be lowered through the main, largely vertical borehole, and then the sensor module can be extended into one or more lateral boreholes. This embodiment can be used in production logging, among other specific applications.

Embedded sensors in a laterally-extendable bistable member can be used monitor the "health" (e.g., the structural strength and integrity) of the member. Such embedded sensors could comprise fiber optic strands or thin electrical conductors. Measurement of conductivity through the embedded electrical conductors, or of light transmission through embedded fiber optic strands, can give indications of whether the member is fatigued or nearing the end of its useful life.

Figure 5:
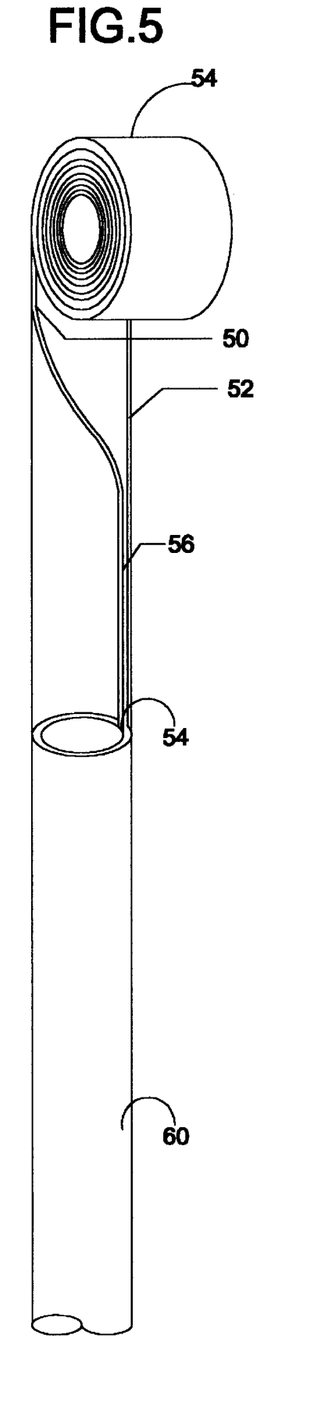
FIGS. 5, 6A, and 6B show various aspects of a wrappable downhole sensor of the present invention.

FIG. 5 shows another embodiment of the present invention, specifically a wrappable downhole sensor apparatus 50. This apparatus comprises a bistable member 52 as described above, which has a relatively flat cross-section when in its coiled form (FIG. 6A), and a semicircular or fully circular cross-section when in its extended form (FIG. 6B). A coiled member can be lowered into a wellbore (by wireline, coiled tubing, or the like), and then unspooled downhole. Alternatively, the spool 54 can be mounted at the surface of a well, and the member deployed from the surface down into the wellbore through the well casing 60. The member 52 has embedded therein one or more sensors 54 and conductors 56 for conveying data, such that measurements of temperature, pressure, or other well parameters can be made and transmitted to the surface. The means for mechanically extending or retracting the member 52, and for conveying data to the surface, can be as described above with respect to the FIG. 1.

Figure 6A:
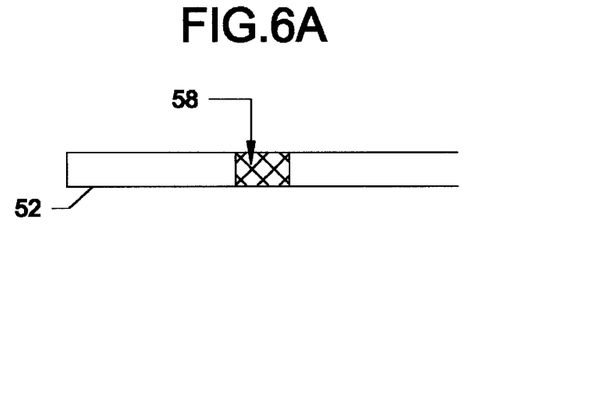
Figure 6B:
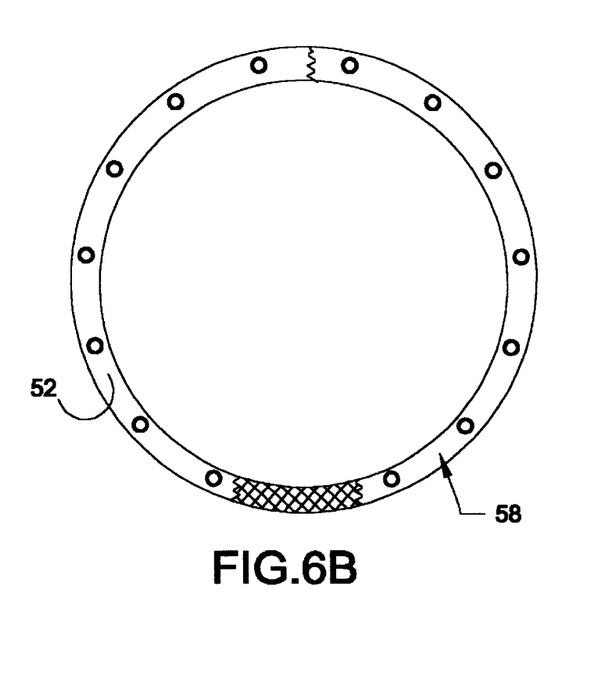

In this embodiment of the invention, it is preferred that the extendable member 52 comprise at least one stiffness enhanced region 58 (see FIGS. 6A and 6B). The stiffness enhanced region can suitably have a variation in the type, layout, and/or thickness of the composite material such that this region has a greater resistance to bending than the rest of the bistable member. Suitable materials for creating such stiffness enhanced regions are described in U.S. Pat. Nos. 5,828,003, 5,933,945, and 6,065,540, each of which is incorporated herein by reference. Multiple laminates can be configured to provide the desired characteristics such as strength and resistance to buckling. The relative stiffness and/or strength can vary along the length of the member 52 depending on the needs of the particular job. In many applications, it is preferable to have increased stiffness at the distal end and increased strength at the proximal end of the member. This configuration allows for longer extension of the distal end while staying within the yield limitations of the materials of construction. One particularly attractive feature of this embodiment of the invention is its ease of installation.

Figures 7A, 7B:
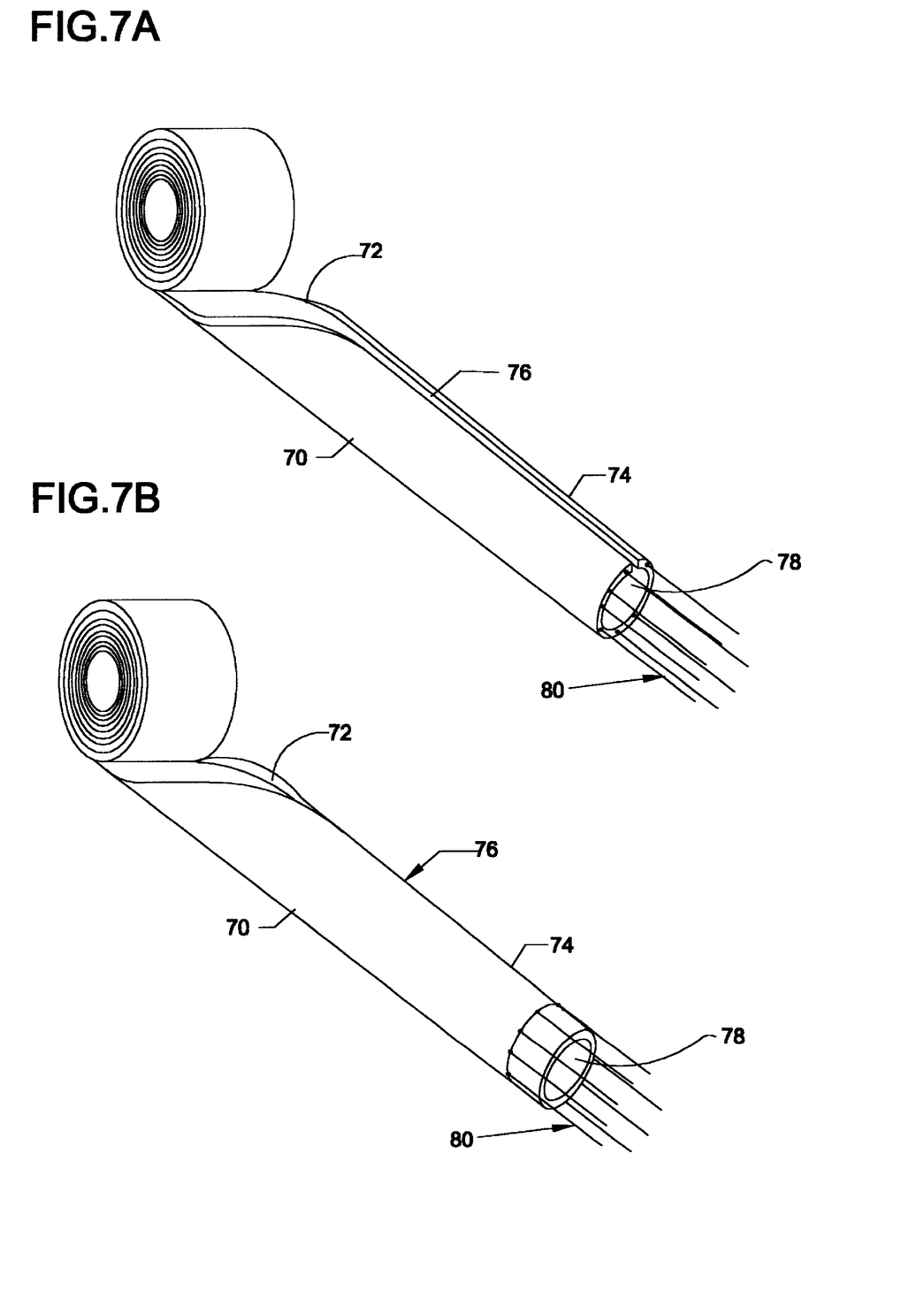
FIGS. 7A and 7B show various aspects of a dual-function wireline-umbilical apparatus of the present invention.

FIGS. 7A and 7B show another embodiment of the invention, in particular a dual function umbilical-wireline structure 70. This structure comprises an extendable bistable member 72 which is relatively flat when coiled and takes on a circular cross-section when extended. This circular cross-section forms a hollow tube 74 having an open seam 76. The open channel 78 in the center of this tube 74 can hold wires 80 or other functional devices for use in well operations. Alternatively, the bistable member 72 can have conductive wires, power cable, fiber optic strands or other devices embedded within it that can be attached to sensors or downhole tools. Preferably, the seam 76 is sealed as shown in FIG. 7B by some means. Suitable methods for sealing include use of a heat source that fuses the two sides of the seam, a mechanical apparatus (analogous to a zipper) that joins the two edges of the seam, and chemical means such as a glue that could later be removed by heat and/or solvent.

The sealed member 72 thus forms a hydraulic channel than can be used to transport or contain fluids in the wellbore. One application of this embodiment is for deploying electrical submersible pumps where the power conductor is embedded in the bistable member wall or is attached to the member wall as it is deployed downhole.

Thus, this embodiment of the invention forms an extendable umbilical for use in a wellbore that can serve the additional function of a wireline, such that downhole tools or other devices can be connected to the umbilical and lowered thereby into the well.

The umbilical itself can be supported in the wellbore or at the surface of the well by a hanger or other support apparatus that is well known to those skilled in the art. Because of its circular cross-section, this dual-purpose structure will have greater rigidity than a conventional wireline. Further, this embodiment of the invention reduces the cost of well equipment, by performing the functions of two separate conventional devices.

Figure 8A:
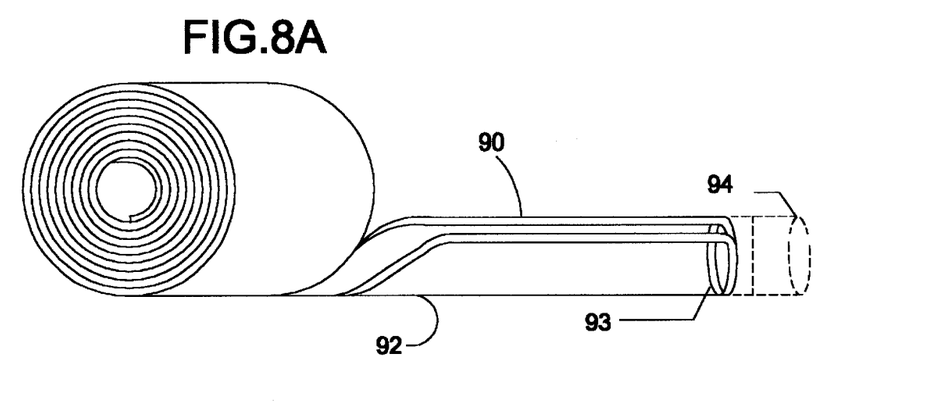
FIGS. 8A and 8B show various aspects of a downhole inspection tool of the present invention.
Figure 8B:
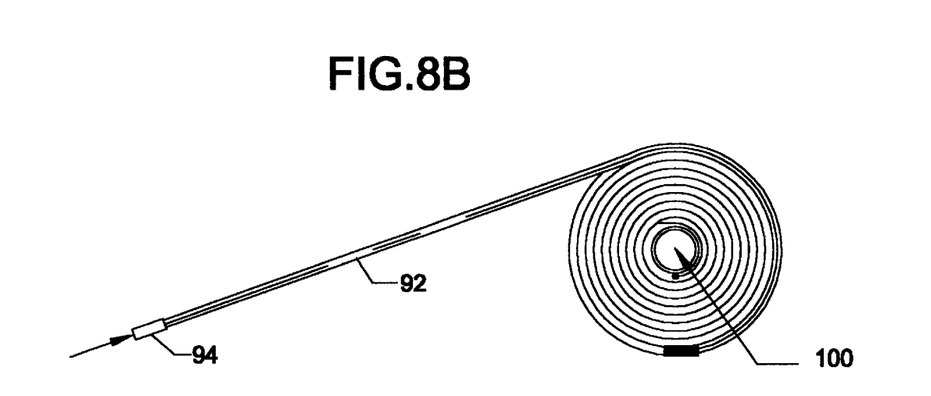

FIG. 8A shows another embodiment of the invention, in particular an inspection tool 90 for coiled tubing or other tubulars made of steel or other metal. As in the embodiments already described, the tool comprises at least one extendable bistable member 92 which is relatively flat when coiled but assumes a semicircular or fully circular cross section when extended. An inspection sensor module 94 can be attached to the distal end 93 of the member 92. Therefore, the member can initially be coiled on a reel 100 as shown in FIG. 8B, and can be unreeled into its extended position, whereby the inspection sensor module can be moved to the site at which the desired inspection is to take place. Suitable inspection methods that can be used include visual inspection using a downhole camera, mechanical inspection utilizing a caliper tool, electrical inspection such as eddy current measurements, and thermal photography.

As described above, typically conductors would be embedded in the member 92 so that data could be conveyed from the sensor module. Optionally, elongated or spaced-apart sensors could also be embedded along the length of the member 92. A stiffness-enhanced design, as described above with respect to FIGS. 6A and 6B, is preferred in this embodiment as well. The deployment mechanism can comprise a reel and motor type system as is well known in the art and commonly used in wireline operations. A modified reel and injector system such as is commonly used in coiled tubing applications could also be utilized. The data acquisition system can comprise a computer that can process, store, manipulate, and display the various signals sent through the present invention. This embodiment of the invention is lighter, more compact, and more flexible than many prior downhole inspection systems.

Another embodiment of the invention comprises a liner for tubing that can serve to protect the inner diameter of the tubing from corrosion. Such a liner can comprise at least one bistable extendable member and means for sealing the outer edges of the member together. When the member is extended, and its two outer edges come into close proximity due to the circular cross-section that the member assumes in the extended form, the two edges can be joined or fused, thereby forming an elongated tubing member that serves as an inner sheath to the original tubing. This sheath protects the original tubing from the corrosive effects of well fluids.

FIGS. 9A–9J show various means for sealing or joining the outer edges of the extendable member. These sealing or joining means can be used with the above-described tubing liner, and in many other embodiments of the invention. A bistable extendable member 112 (shown in cross-section in its flattened, coiled form in FIG. 9A) has two outer edges 116 and 118. A plurality of heaters 114 are embedded in the member near its outer edges 116 and 118 along the length of the member, so that when the member is extended and the two edges are in contact with each other, or in close proximity, the heaters 114 can be activated to melt and fuse the two edges 116 and 118 of the member 112 and thereby form a hollow elongated tubing member 120 (see FIG. 9B). The heaters 114 can comprise resistors that generate heat when electrical current flows through them. The electricity can be supplied by embedded or external power lines or by batteries.

Figure 9A:
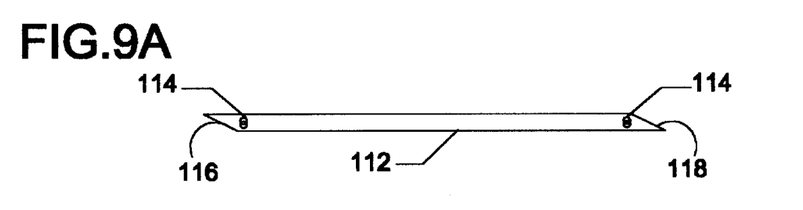
FIGS. 9A–9J show various embodiments of bistable members with closure devices of the present invention.
Figure 9B:
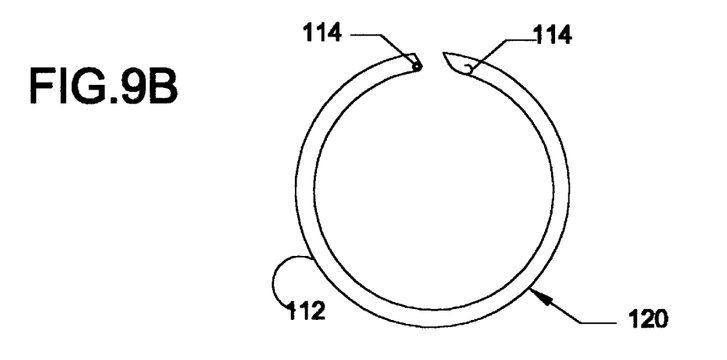
Figure 9C:
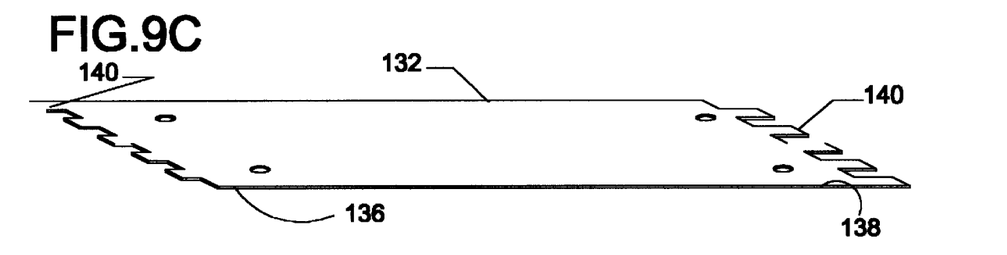
Figure 9D:
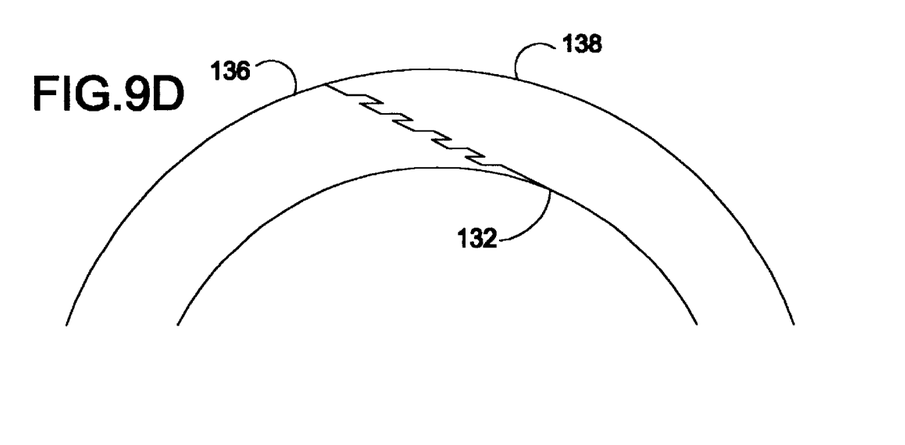

FIGS. 9C and 9D show alternative joining means. FIG. 9C shows a bistable extendable member 132 in its flattened, coiled form. At its two outer edges 136 and 138 are a plurality of teeth 140. When the member 132 is extended and forms a circular cross-section (FIG. 9D), the two sets of teeth engage, and thereby hold the member in a tubular configuration. Alternatively, one edge of the member can comprise a longitudinal groove and the other edge a longitudinal rib, such that the rib fits into and engages the groove when the two edges come into contact. Other types of cooperating indentations and protrusions could be used as well.

Figure 9E:
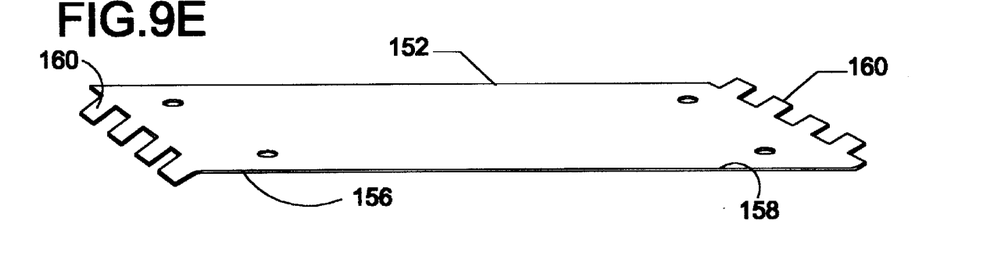
Figure 9F:
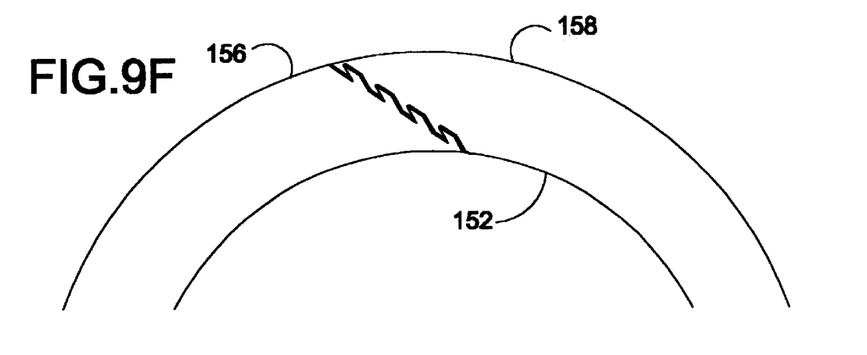

FIGS. 9E and 9F show other joining means. In FIG. 9E, a bistable member 152 is in its flattened, coiled form. At the outer edges 156 and 158 of the member are zipper fastener elements 160. When the member is extended and assumes a circular cross-section (FIG. 9F), the outer edges 156 and 158 come into contact and the zipper elements engage, thus fastening the two edges together and holding the member in a tubular configuration.

Figure 9G:
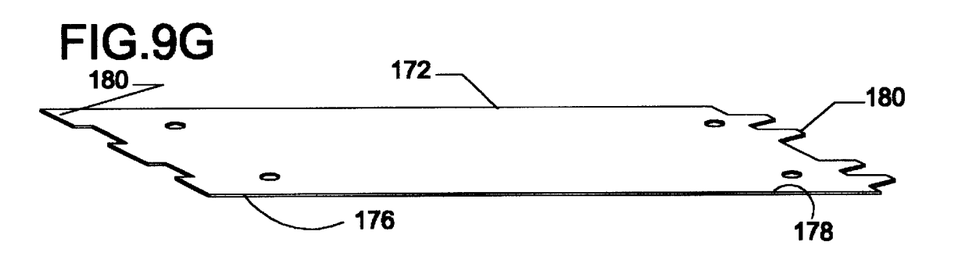
Figure 9H:
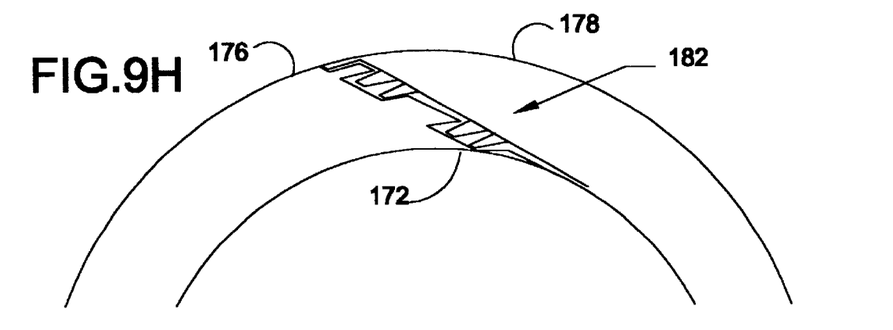

FIGS. 9G and 9H show other joining means. In FIG. 9G, a bistable member 172 is in its flattened, coiled form. At the outer edges 176 and 178 of the member are labyrinth type seal elements 160. When the member is extended and assumes a circular cross-section (FIG. 9H), the outer edges 176 and 178 come into contact and the labyrinth elements form a seal. The configuration of the composite material could be such that when the member is extended and in a circular cross-sectional shape, the inherent stress forces 182 on the member outer edges 176 and 178 are such that they urge the two edges together and enable the labyrinth elements to seal and hold the member in a tubular configuration.

Figure 9I:
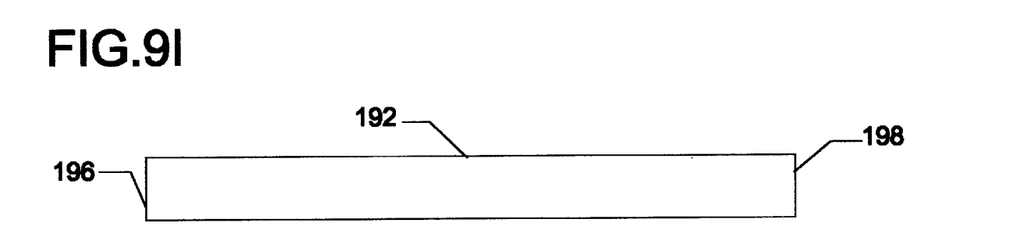
Figure 9J:
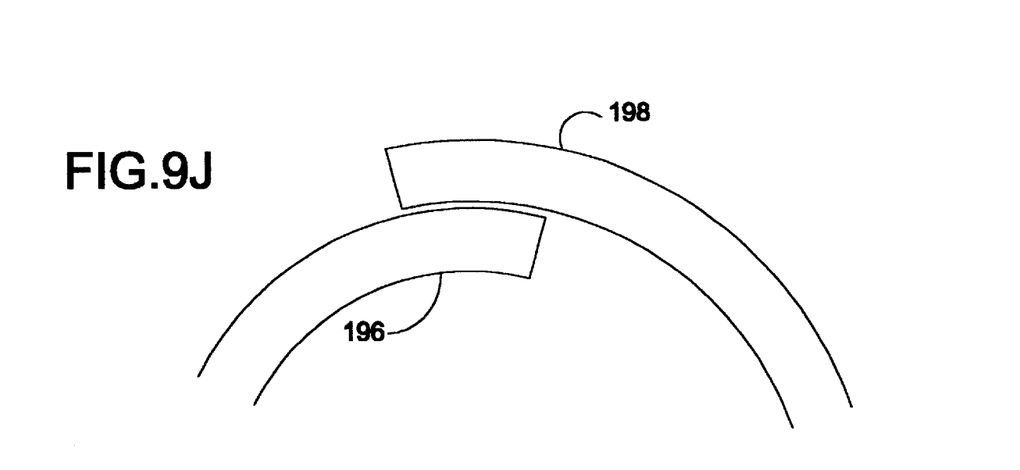

FIGS. 9I and 9J show other joining means. In FIG. 9I, a bistable member 192 is in its flattened, coiled form. When the member is extended and assumes a circular cross-section (FIG. 9J), the outer ends 196 and 198 create an overlap/underlap arrangement with each other, thus forming a seal and holding the member in a tubular configuration. The overlap optionally could be to a much greater extent than is shown in FIG. 9J, thus in effect creating a labyrinth seal.

The preceding description of specific embodiments of the present invention is not intended to be a complete list of every possible embodiment of the invention. Persons skilled in this field will recognize that modifications can be made to the specific embodiments described here that would be within the scope of the present invention.

What is claimed is:

1. Apparatus for use in a wellbore, comprising:
   a first structure that comprises (a) at least one extendable member that can be reconfigured from a coiled form to an extended form, the member having a flattened transverse cross-section when in the coiled form and a curved transverse cross-section when in the extended form, (b) a downhole well tool attached to the extendable member, and (c) a housing in which the extendable member can be coiled;
   a well mounting device for supporting the first structure from the wellbore or the surface of a well; and
   means for reconfiguring the extendable, coilable member in a wellbore from the coiled form to the extended form.

2. The apparatus of claim 1, wherein the extendable member is reversibly configurable between the coiled form and the extended form.

3. The apparatus of claim 1, wherein the extendable member has a substantially planar cross-section when in the coiled form.

4. The apparatus of claim 3, wherein the extendable member has a cross section when in the extended form that is selected from the group consisting of circular, semi-circular, oval, and semi-oval cross-sections.

5. The apparatus of claim 1, wherein the well mounting device is selected from the group consisting of wireline, tubing, casing, and coiled tubing.

6. The apparatus of claim 1, wherein the first structure comprises a laterally extendable bottom hole assembly.

7. The apparatus of claim 6, wherein the bottom hole assembly comprises a housing, a reel on which the extendable member can be coiled, and an aperture in the housing through which the member can be extended laterally.

8. The apparatus of claim 7, wherein the extendable member has a distal end, and wherein the well tool comprises a sensor module that is attached to the distal end of the member.

9. The apparatus of claim 8, wherein the sensor module comprises at least one sensor for measuring at least one well parameter selected from the group consisting of pressure, temperature, pH, and flow rate.

10. The apparatus of claim 1, wherein the first structure comprises a wrappable downhole sensor assembly.

11. The apparatus of claim 10, wherein the extendable member has embedded therein at least one sensor.

12. The apparatus of claim 11, wherein the sensor measures at least one well parameter selected from the group consisting of pressure, temperature, pH, and flow rate.

13. The apparatus of claim 1, wherein the first structure comprises an umbilical-wireline structure.

14. The apparatus of claim 13, wherein the first structure further comprises a fastening mechanism for joining two lateral edges of the extendable member when it is in the extended form.

15. The apparatus of claim 14, wherein the fastening mechanism is selected from the group consisting of zipper apparatus and heat-generating fuser apparatus.

16. The apparatus of claim 1, wherein the downhole well tool comprises a wellbore tubular inspection tool.

17. The apparatus of claim 1, wherein the first structure comprises a corrosion-resistant coiled tubing liner.

18. The apparatus of claim 17, wherein the extendable member is extended and two lateral edges of the member are sealed to each other to form a fluid containment bore.

19. The apparatus of claim 1, wherein the extendable member comprises embedded sensors that have the capability of monitoring the condition of the extendable member.

20. The apparatus of claim 19, further comprising fiber optic strands or electrical conductors embedded in the extendable member.

21. The apparatus of claim 1, wherein the extendable member, when in the extended form, overlaps on itself to form a seal around a hollow bore.

22. The apparatus of claim 1, wherein the downhole well tool comprises an electrical submersible pump.

23. The apparatus of claim 1, wherein the downhole well tool comprises a fishing tool.

24. The apparatus of claim 1, wherein the downhole well tool comprises a sand control screen.

25. The apparatus of claim 1, wherein the downhole well tool comprises a patch for tubular repair.

26. The apparatus of claim 1, wherein the downhole well tool comprises an anchor for anchoring the apparatus to well tubing or casing.

* * * * *